P. CARLSON.
COTTON CHOPPER.
APPLICATION FILED AUG. 14, 1911.
1,043,201.
Patented Nov. 5, 1912.
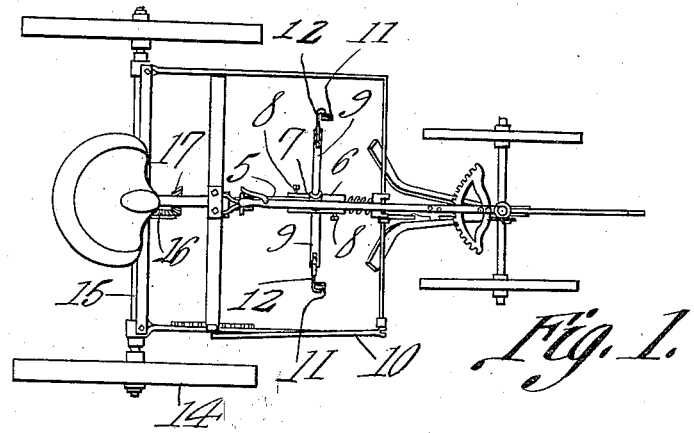
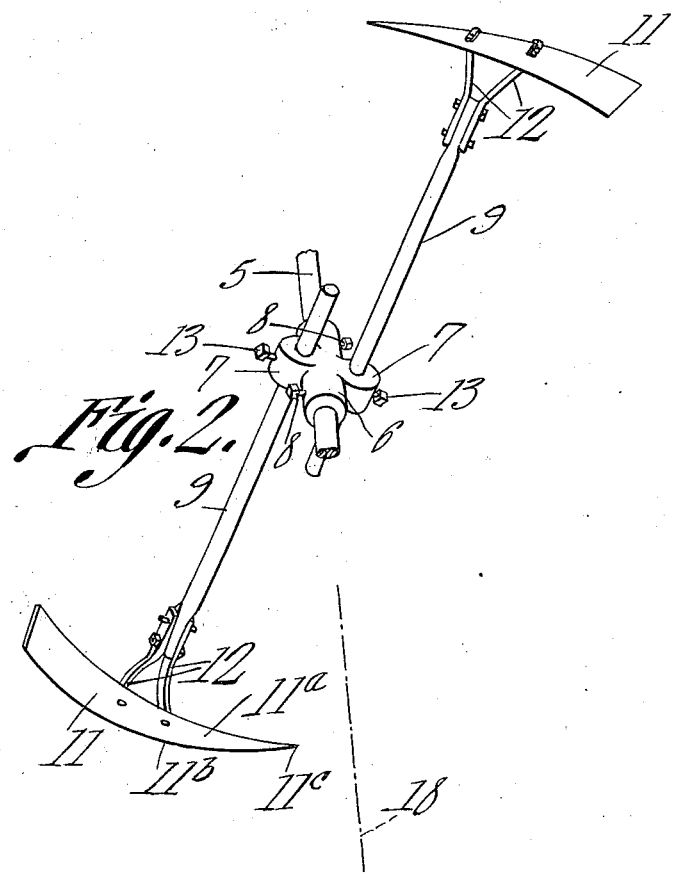
Witnesses
Peet Carlson, Inventor
by C. A. Snow & Co. Attorneys

UNITED STATES PATENT OFFICE.

PEET CARLSON, OF CARLSON, TEXAS.

COTTON-CHOPPER.

1,043,201.

Specification of Letters Patent. Patented Nov. 5, 1912.

Application filed August 14, 1911. Serial No. 643,954.

*To all whom it may concern:*

Be it known that I, PEET CARLSON, a citizen of the United States, residing at Carlson, in the county of Travis and State of Texas, have invented a new and useful Cotton-Chopper, of which the following is a specification.

This invention relates to cotton choppers and particularly to the chopping blades of such implements.

The objects of this invention are to provide novel means for supporting or mounting the chopping blades and to provide novel means for the adjustment thereof with respect to the rotary shaft of the cotton chopper.

With the above objects in view this invention is embodied in the construction of parts as hereinafter described and claimed and as illustrated in the accompanying drawings, in which similar reference characters indicate similar parts, and in which:—

Figure 1 is a plan view of the cotton chopper embodying the invention. Fig. 2 is a perspective of a fragmental portion of the rotary shaft and the chopping blades secured thereto.

Referring specifically to the drawings, the numeral 10 designates a suitable rectangular frame having the axle 15 journaled for rotation therein at the rear end thereof to the ends of which are secured the ground wheels 14. A longitudinal shaft 5 is journaled for rotation in the frame 11 and at its rear end is provided with a bevel gear 17 which meshes with a bevel gear 16 mounted on the axle 15, whereby as the frame is drawn forward a rotary motion is given the shaft 5.

The foregoing parts are common to cotton choppers and are clearly shown in my former Patent No. 986,137, issued March 7, 1911.

On the shaft 5 is secured a sleeve 6 by means of set screws 8 and this sleeve is provided with diametrically opposed lugs 7 projecting from the periphery thereof, which lugs 7 have apertures therethrough tangential with the said sleeve. Arms 9 are passed through the apertures in lugs 7 and each of the said arms has a pair of brackets 12 bolted to the opposite sides thereof at its outer end. These brackets 12 have their outer or free ends bent angularly to bear against the outer faces of the blades or hoes 11 which blades are pointed at their forward ends as shown at 11ᶜ, the edges 11ᵇ and 11ᵃ thereof diverging rearwardly and the edges 11ᵇ being sharpened. The outer or free ends of the brackets 12 which bear against the outer faces of the blades are secured to the blades in any suitable manner, the brackets passing over the rear edges 11ᵃ of the blades. These blades 11 are curved about the axis of a shaft 5 as a center and set screws 13 are provided in the lugs 7 for engaging the arms 9 to retain same in any adjusted position to which they are set. As the cotton chopper is drawn over the row of plants the shaft 5 is rotated to carry the blades or hoes 11 around therewith. The blades or hoes being curved travel evenly on the surface of the ground or at any depth below the surface. The front ends of the blades being pointed permits the blades to pass between the plants without knocking them down or injuring the plants, the sharpened edge 11ᵇ being arranged diagonally severs the plants or stalks immediately in front thereof. These blades 11 can be adjusted to cut below the surface at a suitable depth or on or above the surface by loosening the set screws 13 and sliding the arms inward or outward. The arms 9 may also be turned within their lugs 7 to vary the angle at which the blades 11 strike the rows of plants to increase or decrease the number of plants chopped thereby. In Fig. 2 the row of plants has been diagrammatically represented by the dotted line 18 to illustrate this point and as shown the blades 11 are adjusted to strike the row at right angles thus severing the least number of plants, whereas, upon the blades 11 being turned to bring the sharpened edges 11ᵇ thereof at an acute angle against the rows 18 a greater number of plants are severed thereby, the point 11ᶜ in both cases passing between the plants to prevent same from being knocked down or damaged thereby. The blades 11 being seated against and secured to the angular ends of the respective pairs of brackets are securely held in position, and as each blade severs the plants or stalks the blade is prevented from being swung on the brackets for the reason that the angular ends of the brackets extend over the outer faces of the blades which will therefore support the blades in an efficient manner. The edge of the blade which is sharpened is arranged away from the brackets 12 and the brackets 12 follow in rear of the path of the blade as the blade is rotated. The blades having their outer faces secured to the angular ends of the brackets present a smooth inner face, which is desirable for effectively severing the plants or stalks.

Particular stress is applied to the form or shape of the chopping blade and to the manner of adjusting same. It is also understood that although these particular chopping blades are shown and described as applied to a cotton chopper of a design as shown in my former patent above mentioned the same may be applied to various forms of cotton choppers having a rotating member or shaft.

What is claimed is:—

In a cotton chopper, the combination of a longitudinal rotary shaft, radial arms carried thereby and adapted for adjustments radially of the shaft and rotatably about their axes, a pair of brackets secured to the opposite sides at the outer end of each arm, each pair of brackets having their free ends bent angularly, and a blade having its outer face seated against and secured to the angular ends of each pair of brackets, the blades being curved about the shaft as a center and having their forward ends pointed and having their edges diverging rearwardly, the edges of the blades away from the brackets being sharpened.

In testimony that I claim the foregoing as my own, I have hereto affixed my signature in the presence of two witnesses.

PEET CARLSON.

Witnesses:
WALTER KEEBLE,
JNO. H. JENKINS.

---

Copies of this patent may be obtained for five cents each, by addressing the "Commissioner of Patents, Washington, D. C."